April 28, 1970  G. E. NOE  3,508,901
GLASS FEEDING STIRRER
Filed Nov. 13, 1967  2 Sheets-Sheet 1
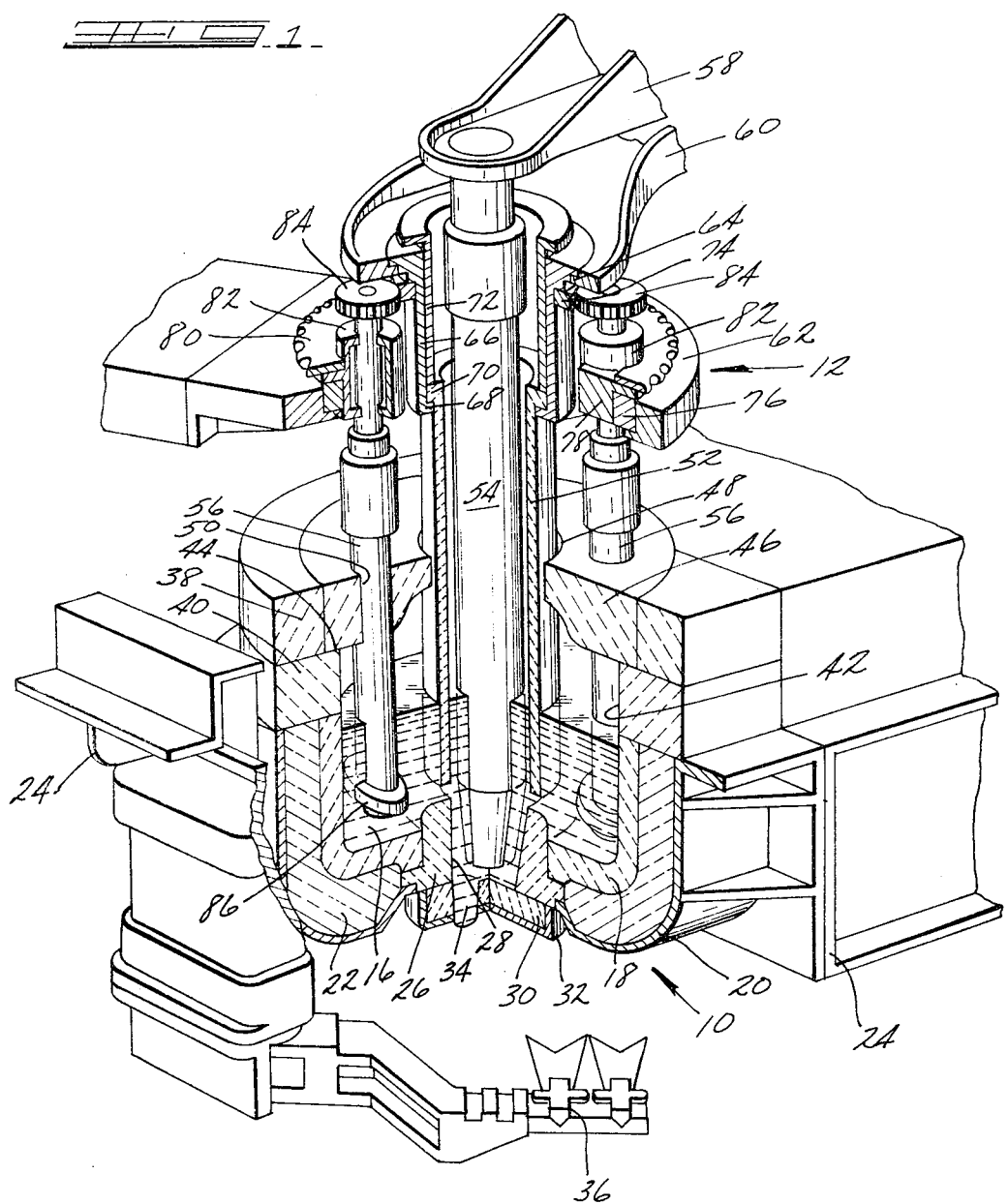
INVENTOR.
GEORGE E. NOE
BY E. J. Holler &
W. A. Schaich
ATTORNEYS April 28, 1970         G. E. NOE         3,508,901
GLASS FEEDING STIRRER
Filed Nov. 13, 1967                    2 Sheets-Sheet 2
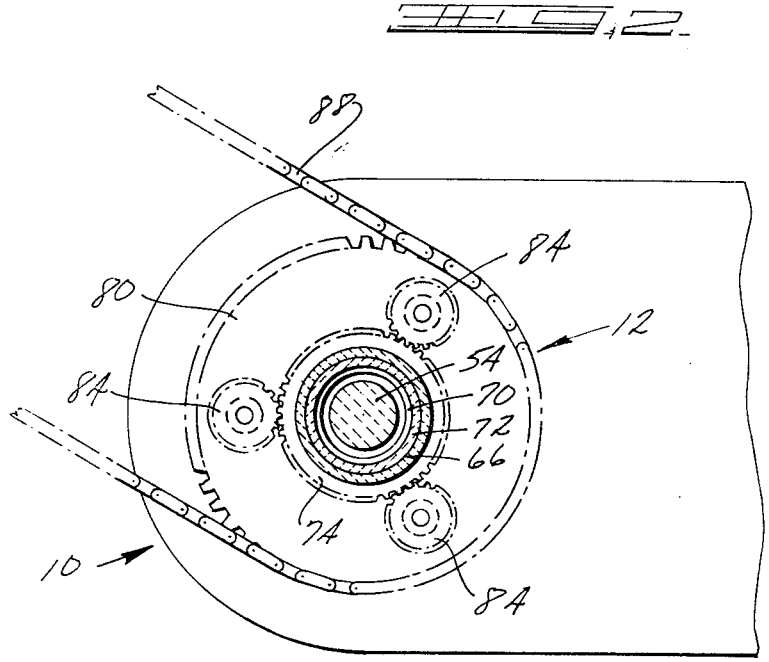
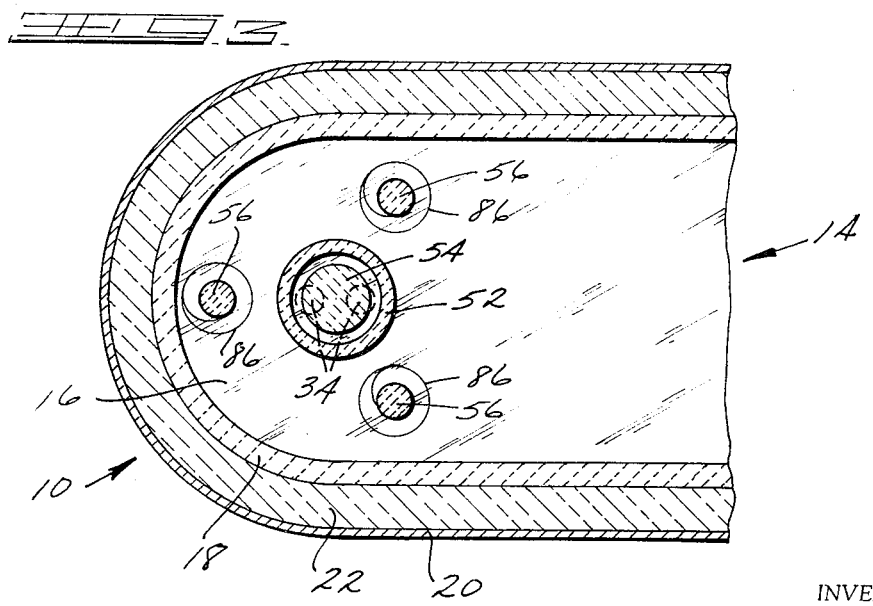
INVENTOR.
GEORGE E. NOE
BY
C. J. Hollen &
W. A. Schaich
ATTORNEYS

United States Patent Office 3,508,901
Patented Apr. 28, 1970

3,508,901
GLASS FEEDING STIRRER
George E. Noe, Toledo, Ohio, assignor to Owens-Illinois, Inc., a corporation of Ohio
Filed Nov. 13, 1967, Ser. No. 682,333
Int. Cl. C03b 5/18
U.S. Cl. 65—180                                      1 Claim

ABSTRACT OF THE DISCLOSURE

Method and apparatus for improving uniformity and homogeneity of glass gobs as they issue from gob feeder-bowls, wherein a plurality of stirring screws are positioned adjacently outwardly of a reciprocating plunger element each being adopted for simultaneous rotation about a common central axis and about their individual axes.

BACKGROUND OF INVENTION

This invention relates to glass feeding in which a forehearth communicates with, and receives glass from, a melting furnace and has at is outer extremity a delivery or feeding bowl from which mold charges of molten glass issue and are thereby supplied to suitable forming machines. More particularly, it relates to such feeding apparatus in which mold charges are successively accumulated and severed in suspension below a single discharge orifice or a plurality of such orifices.

In one type of well known glass manufacturing process, molten glass is supplied to a forehearth from a suitable melting furnace and progresses to a feeder-bowl located at the outer forehearth end. This bowl typically includes a feeding assembly comprised of a vertically reciprocating plunger which serves to extrude the molten glass through an orifice and synchronized shear blades disposed externally of the orifice for severing the extruded glass into individual gobs, or mold charges, which are then formed into glass articles. To facilitate the control of the glass discharging operation, there is generally employed a tubular member or sleeve in circumscribing relation with respect to the plunger, the sleeve being vertically adjustable and thereby functioning as a valve.

Those skilled in the art readily appreciate the fact that, if high quality glass articles are to be formed from gobs produced by the foregoing technique, these gobs must be uniform and homogeneous with regard to such parameters as size, density, temperature and viscosity. Thus, it becomes imperative that the molten glass existing in the bowl be at least homogeneous in nature at the time it is supplied to the reciprocating plunger for extrusion. The problem of maintaining a uniform glass temperature, and therefore uniform viscosity, at the time of extrusion is particularly acute because of the inherent heat losses which result through both conduction and radiation as the glass proceeds through the forehearth and settles in the feeder bowl.

Generally two approaches have been taken in attempting to eliminate or minimize the existance of temperature gradients in the molten glass of the feeder bowl. In one, the tubular member or sleeve hereinbefore noted is rotated about the plunger axis while in the other there is provided a stirring element disposed outwardly of the tubular member having oblong vertical legs extending into the molten glass, the stirring element also being rotated about the plunger axis. While these embodiments have, to a certain extent, minimized temperature and viscosity gradients in the molten glass, they have not resolved the problem satisfactorily in all respects. With double gob operations, for example, excessive temperature gradients of the molten glass adjacent the plunger still persist thereby limiting the ability to discharge uniform, homogeneous glass charges into the forming machines. This difficulty is even more pronounced for triple gob operations.

SUMMARY OF THE INVENTION

In accordance with this invention, there is provided an improved mixing method and apparatus whereby undesirable temperature gradients and other striations such as cords, existing in the molten glass in a feeder bowl are substantially eliminated, thus allowing uniform homogeneous charges of molten glass to be produced by multiple gob operations. More particularly, there is provided in accordance with this invention a plurality of screw stirrers, equispaced about a common axis and being disposed radially and outwardly adjacent the sleeve and plunger of a conventional feeding assembly, the stirrers being provided with means for rotating the stirrers unitarily about a common axis and means for simultaneously rotating the individual stirrers about their respective axes.

BRIEF DESCRIPTION OF THE DRAWINGS

Other advantageous features of this invention will become apparent upon reference to the drawings, of which:

FIGURE 1 is a perspective view, partly in section, illustrating an embodiment of this invention in its relationship with a feeder bowl;

FIGURE 2 is a plan view partly in horizontal section illustrating an embodiment of this invention;

FIGURE 3 is a horizontal sectional view showing the relation of the screw stirrers of this invention with respect to the tube and reciprocating plunger elements of a gob-feeder assembly.

DESCRIPTION OF THE PREFERRED EMBODIMENTS

Referring now more specifically to the drawings, there is shown a feeder-bowl 10 located at the outer end of a forehearth 14 whereby molten glass 16 flows from the latter into the former, the glass being discharged from bowl 10 by a glass feeding assembly 12 having elements operable within the feeder-bowl. Generally bowl 10 includes an inner refractory block 18 in contact with molten glass 16, an outer casing 20 and an intermediate insulating block 22, casing 20 being mounted to a suitable assembly 24 for structural support. The floor of the bowl includes a refractory element 26 projecting upwardly therefrom and defining a central opening 28 therein. Disposed externally of bowl 10 are integral ring and pan members, 30 and 32 respectively, which define the glass discharge orifices 34, the latter being in fluid communication with central opening 28. As shown in FIGURE 3, the preferred embodiment contemplates a double gob operation by the provision of two such orifices 34. It is understood however, that single or triple gob operations may also be employed. Adjacently beneath ring 30 and pan 32 are shears 36 operable in a manner well known in the art to sever the glass issuing from orifies 34 into individual glass charges, more commonly termed "gobs."

The upper margin of bowl 10 includes an integrally mounted, generally annular cover comprised of juxtaposed refractory insulating blocks 38 and 40 respectively, which define an upper opening 42 in the bowl. In the preferred embodiment upper block 38 has its inner surface disposed somewhat outwardly of lower block 40 thus forming a shoulder 44 capable of rotatably supporting an insulating block 46. This latter block is provided with a central aperture 48 and a plurality of equispaced smaller apertures 50 disposed radially outwardly of central aperture 48. Preferably the plural equi-spaced apertures are three in number and circular, located about 120 degrees apart in a circular array. As will subsequently be described, central aperture 48 is adapted to receive a vertically-disposed tubular member 52 and plunger 54, whereas the respective plural apertures 50 receive vertically-disposed stirring implements 56.

Upwardly of bowl 10 are three support arms, 58, 60 and 62 respectively. Arm 58 is connected to the upper portion of plunger 54, the latter extending downwardly through central aperture 48 of insulating block 46 and terminating beneath the surface of molten glass 16. In the preferred embodiment plunger 54 is in vertical alignment with central opening 28 and arm 58 is adapted, by suitable means (not shown), for vertically upward and downward reciprocating motion whereby the plunger is operable within central opening 28 to extrude glass through discharge orifices 34. Arm 60 includes an inwardly-projecting ledge 64 which supports a downwardly projecting collar 66, the latter being disposed radially outwardly of plunger 54 and having an inwardly projecting flange 68.

Tubular member 52 is formed with a complimentary outwardly projecting flange 70 which is supportingly positioned upon flange 68. Thus, tubular member 52 depends downwardly from said complimental flange through central aperture 48 and has its lower portion immersed below the molten glass surface outwardly of plunger 54. Preferably the lower end of tube 52 is disposed slightly above the upper margin of refractory element 26 and the entire tube supporting assembly is movable upwardly and downwardly, as is well known in the art, whereby the tube functions as a valve to control the quantity of glass passing between tube 52 and element 26 into the proximity of reciprocating plunger 54. As will be readily apparent from the drawings, tubular member 52, though being vertically adjustable, is according to the preferred embodiment stationary. That is, it does not rotate about the plunger. Additional rigidity and stability of tubular member 52 may be provided by positioning a sleeve 72 within collar 66, the former projecting downwardly and engaging the upper surface of flange 70 to lock same between the sleeve and collar-flange 68. For purposes subsequently to be described, an outwardly-projecting spur gear 74 is stationarily mounted on collar 66.

Arm 62 generally circumscribes collar 66 and provides support for the stirrer assembly yet to be described. Disposed along the inner face of arm 62 is a suitable bearing block 76 which rotatably supports a stirrer retaining block 78. Stirrer retaining block 78 has a sprocket element 80 rigidly affixed thereto and includes a series of bearing assemblies 82 which serve to rotatably secure implements 56 to retaining block 78 and sprocket 80. As will be seen in FIGURES 1 and 2, implements 56 proceed upwardly and downwardly from their journaled relationship with bearing assemblies 82. Their upper margins include spur gears 84 which are meshable with stationary spur gear 74 and their lower margins which project downwardly through the equi-spaced apertures 50 of insulating block 46 include spiral screw threads 86. The screw threads are located proximate the floor of bowl 10 adjacently outwardly of the lower ends of tubular member 52.

Thus in the operation of the feeding assembly, sprocket 80 is driven by suitable means such as, for example, a chain 88. This in turn rotates the stirrer retaining block 78, and insulating block 46, causing the axis of screw threaded implements 56 to be rotated in a generally circular path about the reciprocating plunger 54. As this rotation is taking place, spur gears 84 intermesh with stationary spur gear 74 and thereby rotate each implement about its individual axis causing the spiral screw threads 86 to shear the glass and provide improved mixing which substantially eliminates temperature gradients in the glass as it proceeds under tube 52 into the extrusion zone. It has been found that such stirring closely adjacent a point of use is of particular utility in eliminating deleterious conditions in the delivered glass as evidenced by the consistent production of high-quality defect-free glassware.

I claim:

1. In a continuous glass feeding apparatus of the type having a reciprocating plunger adapted to extrude molten glass through a discharge orifice of a glass feeding bowl, a stationary vertically adjustable tubular member disposed concentrically about said plunger for regulating the flow of molten glass extruded by said plunger, a rotatable support surrounding said tubular member, means for rotating said support, a plurality of equally spaced bearings mounted in said support, a vertically disposed rotatable stirrer journaled in each of said bearings, each stirrer having a screw thread adjacent the lower end thereof in proximity to the bottom of said bowl and immersed in the molten glass, each stirrer having a pinion secured to the upper end thereof, an annular gear attached concentrically to said tubular member, said pinions meshing with said gear to rotate said stirrers about their individual axes during rotation of said support whereby the molten glass in said bowl is intermixed and sheared prior to its extrusion from said orifice by said plunger.

References Cited

UNITED STATES PATENTS

| | | | |
|---|---|---|---|
| 471,337 | 3/1892 | Humphreys | 254—102 |
| 2,217,182 | 10/1940 | Peiler | 65—178 XR |
| 2,237,957 | 4/1941 | Christensen et al. | 259—102 |
| 2,238,800 | 4/1941 | Mueller | 65—178 XR |
| 2,707,621 | 5/1955 | Peiler | 65—178 XR |

FRANK W. MIGA, Primary Examiner